United States Patent [19]

Lehnertz et al.

[11] Patent Number: 5,371,888
[45] Date of Patent: Dec. 6, 1994

[54] USING SPECIALIZED OUTPUT DEVICE JOB SPOOLER AS GENERIC BUFFER MANAGER

[75] Inventors: Gary K. Lehnertz; Kenneth L. Milsted, both of Boynton Beach, Fla.; Bryan J. Wright, Tucson, Ariz.; Kevin L. Zemanek, Boca Raton, Fla.

[73] Assignee: International Business Machines Corporation, Armonk, N.Y.

[21] Appl. No.: 755,469

[22] Filed: Sep. 5, 1991

[51] Int. Cl.$^5$ .............................................. G06F 9/00
[52] U.S. Cl. .................................... 395/650; 395/250; 395/700; 364/235; 364/244.3; 364/281.3; 364/DIG. 1
[58] Field of Search ............... 395/101, 106, 110, 112, 395/115, 116, 164, 250, 500, 650, 700; 364/235, 237.82, 242.2, 281.3, 930, 932.62, 941.4, 244.3

[56] References Cited

U.S. PATENT DOCUMENTS

| | | | |
|---|---|---|---|
| 4,807,142 | 2/1989 | Agarwal et al. | 364/650 |
| 4,947,345 | 8/1990 | Paradise et al. | 364/519 |
| 5,113,494 | 5/1992 | Menendez et al. | 395/163 |
| 5,226,161 | 7/1993 | Khoyi et al. | 395/650 |
| 5,243,691 | 9/1993 | Kuwabara et al. | 395/112 |

OTHER PUBLICATIONS

Alfieri, "The Best Book of Wordstar", 1991, pp. 82–84.

Primary Examiner—Gareth D. Shaw
Assistant Examiner—Dennis M. Butler
Attorney, Agent, or Firm—Anibal Jose Cortina; Geoffrey A. Mantooth

[57] ABSTRACT

In a user interactive multitasking data processing system, a comprehensive managing subsystem is constructed for managing queued processing of tasks of a particular type that ordinarily are not handled on a queued basis by the associated operating system. The subsystem is constructed around a task control utility which lacks capability for controlling required display presentation and queue managing functions for the respective task type. The utility is adapted to interface with operating system elements that ordinarily perform display and queue management functions relative to tasks other than the tasks handled by the utility. In the embodiment specifically disclosed, a utility for managing queued processing of page image data (e.g. data produced by document scanners or other image capture devices) interfaces with Presentation Manager and Print Spooler elements of the OS/2 TM Operating System. The utility per se lacks functional capabilities for display and queue management, which are required for managing the processing of associated image data, and therefore requires considerably less storage capacity than it would need if such capabilities were included. These functions are performed by the OS/2 elements to which the utility interfaces. However, the utility accesses image data in the queues created by the OS/2 Spooler transparent to (i.e. without cooperation of) the Spooler, when transferring such data between the queues and associated processing applications. Thus, the utility operates more efficiently than it would if required to invoke the Spooler when making such transfers.

15 Claims, 11 Drawing Sheets

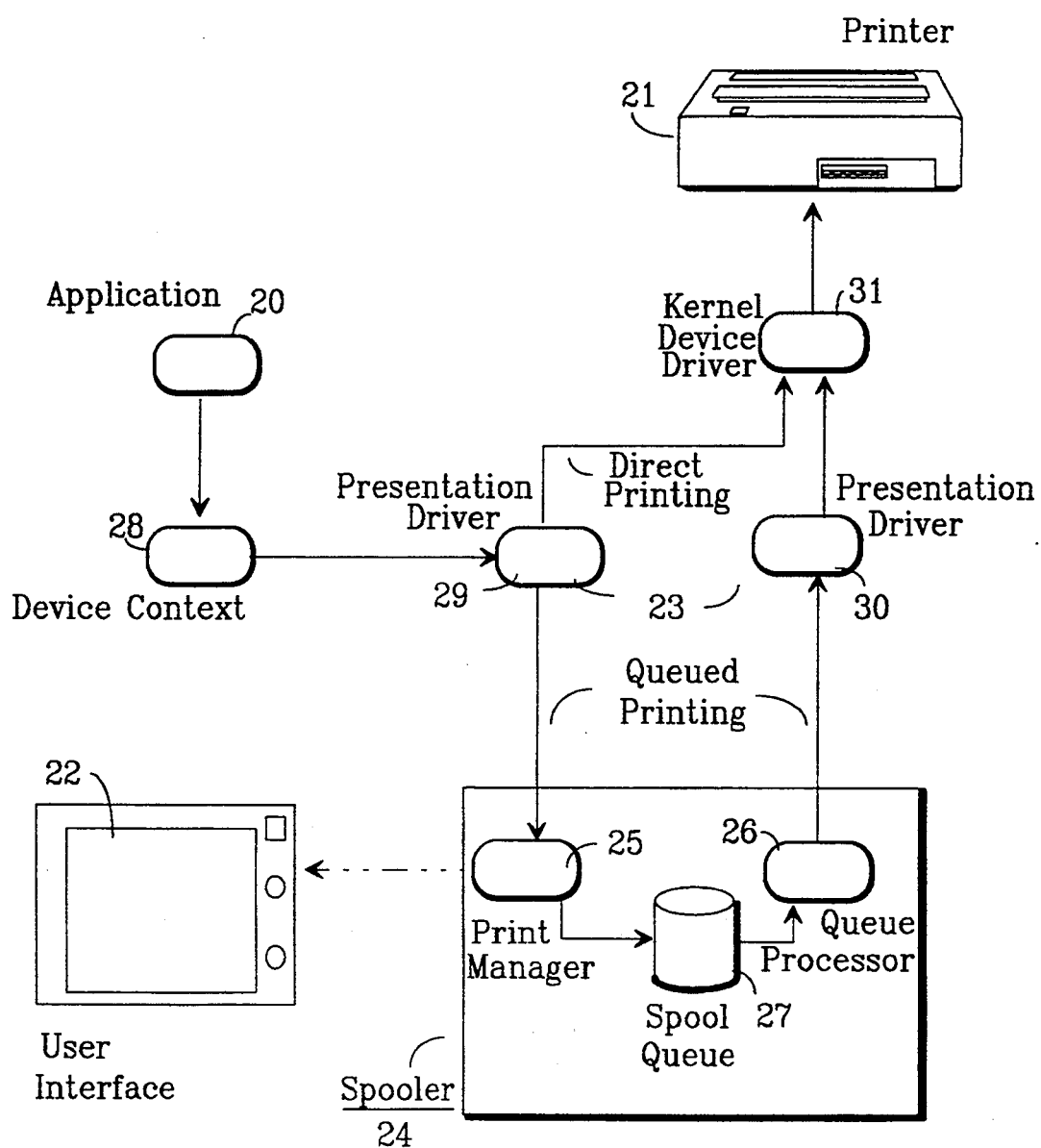
Figure 2 — Prior Art

Figure 2A

C:\SPOOL\PRN_1:         \JOBP11
                        \JOBP12
                           |
                           |

C:\SPOOL\PRN_2:         \JOBP21
                        JOBP22
                           |
                           |

Figure 3A

C:\SPOOL\PRN_N:         \JOBPN1
                           |
                           |

C:\SPOOL\SCANQ_1:       \JOBS11
                           |
                           |

Figure 4 (Queue Creation)
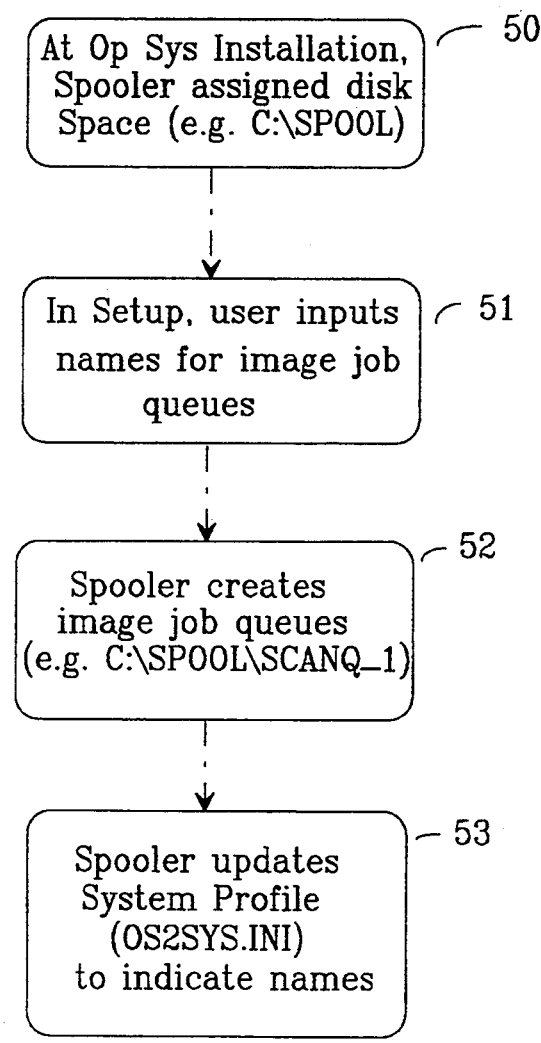

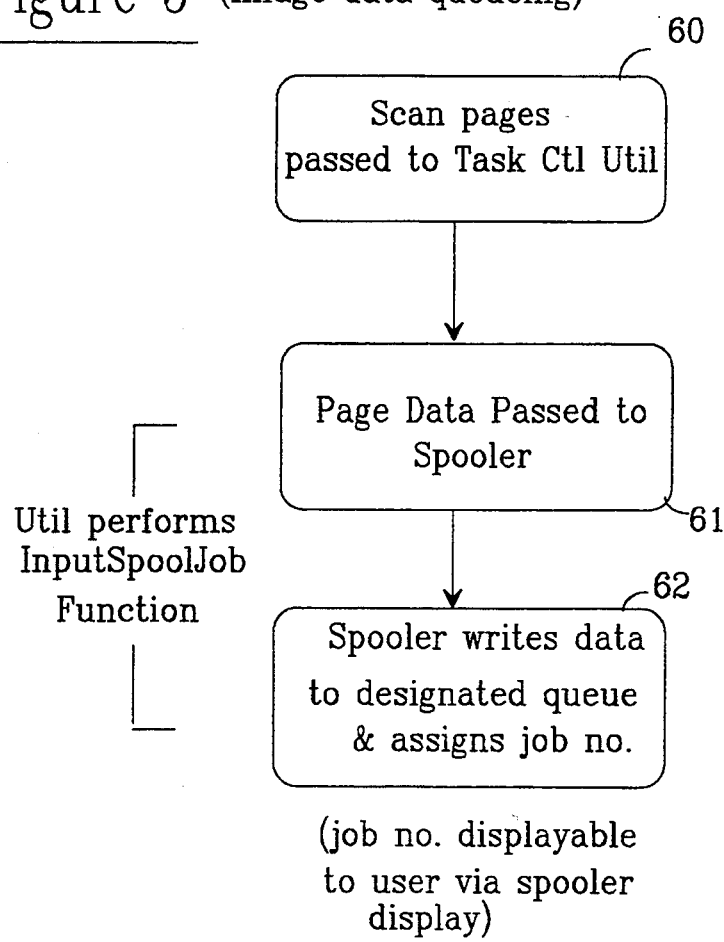
Figure 5 (Image data queueing)

Figure 6   (Image data retrieval)
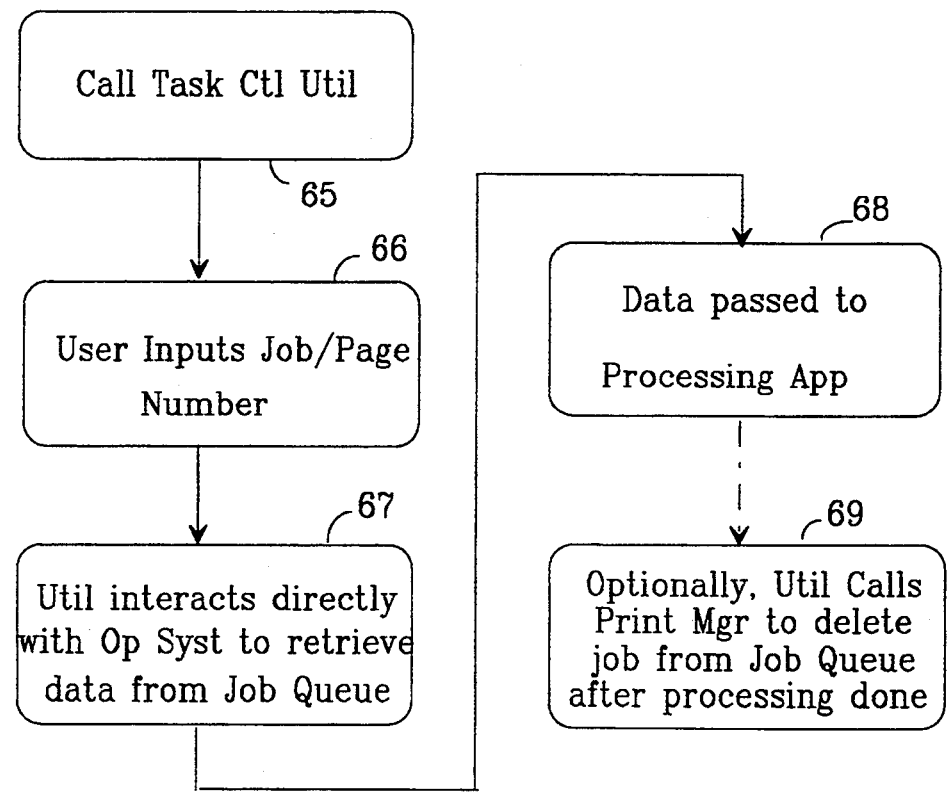

Figure 7 (Image Data Spooling)
Task Ctl Util Executes InputSpoolJob Op
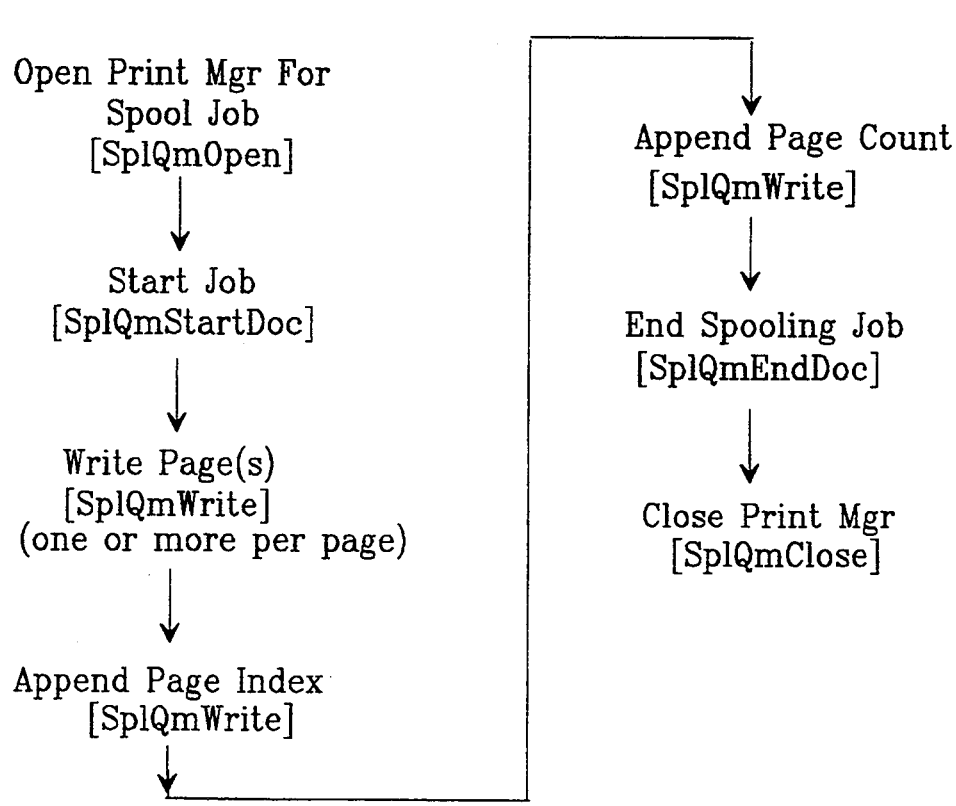

Figure 7A (Spool Job File Organization)
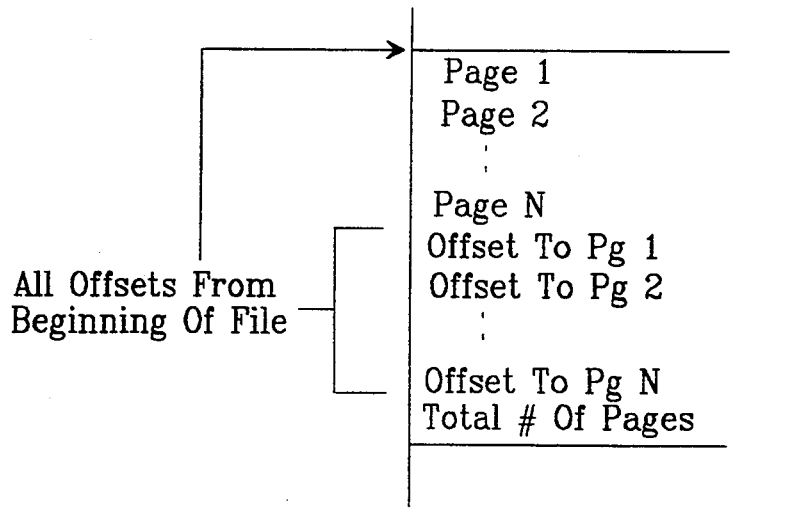
Figure 7B
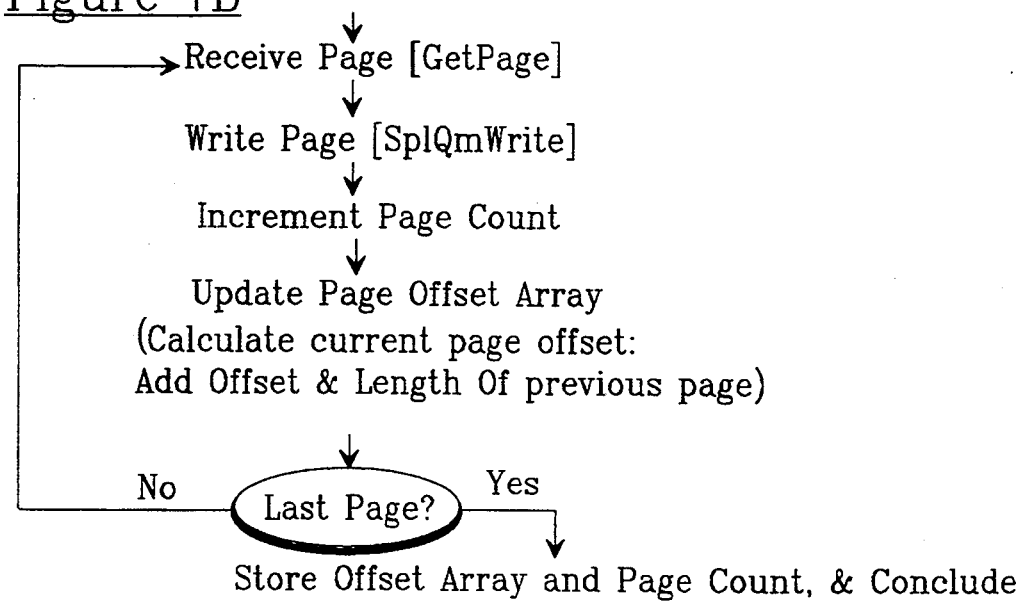

Figure 8 (Image Data Retrieval)
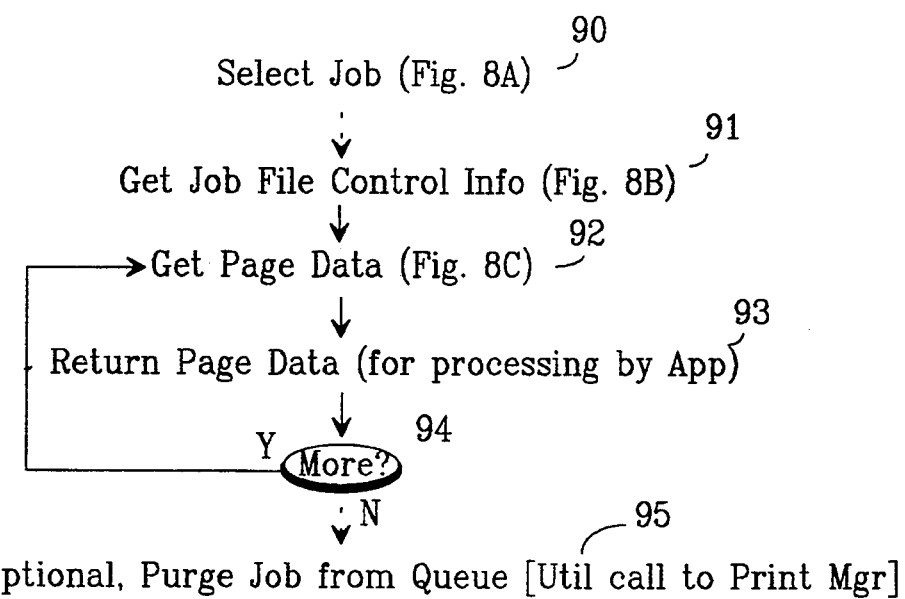
Figure 8A (Select Job)
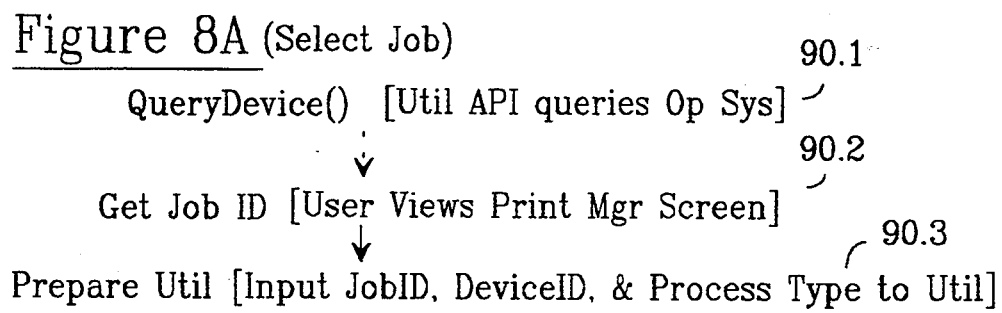

Figure 8B (Get File Control Info)

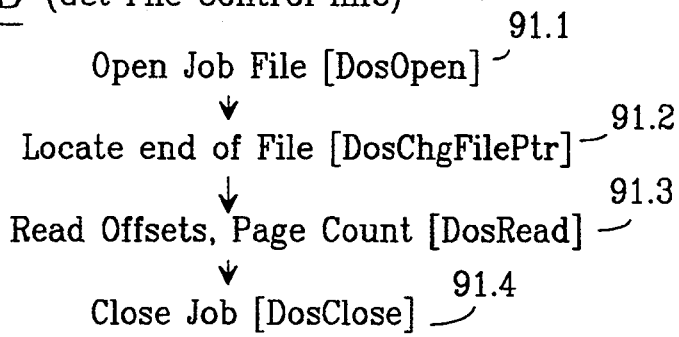

Open Job File [DosOpen]  91.1
↓
Locate end of File [DosChgFilePtr]  91.2
↓
Read Offsets, Page Count [DosRead]  91.3
↓
Close Job [DosClose]  91.4

Figure 8C (Get Page Data)

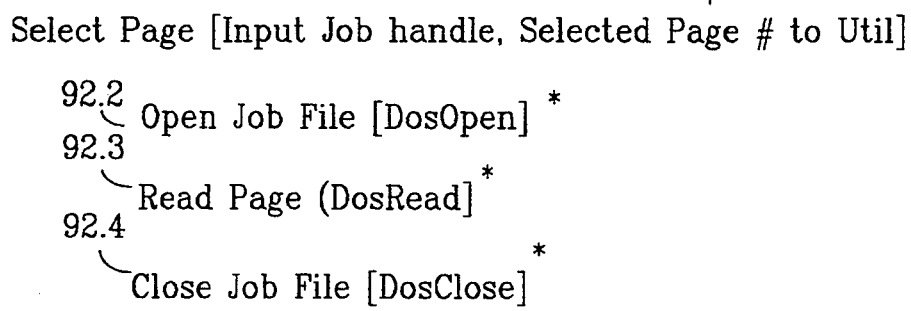

Select Page [Input Job handle, Selected Page # to Util]  92.1

Open Job File [DosOpen] *  92.2

Read Page (DosRead] *  92.3

Close Job File [DosClose] *  92.4

*Note – these operations must be repeated for each page, in order to avoid potential conflicts between programs seeking to process pages and programs seeking to cancel jobs.

USING SPECIALIZED OUTPUT DEVICE JOB SPOOLER AS GENERIC BUFFER MANAGER

FIELD OF THE INVENTION

This invention relates no user interactive multitasking data processing systems, and particularly to management of specific tasks in such systems.

BACKGROUND OF THE INVENTION

For present purposes, a user interactive data processing system is defined as a system capable of interacting with individual users through input devices (e.g. keyboard, mouse, etc.) and output devices (e.g. displays). A multitasking system is a system in which data associated with multiple processing tasks can be queued in system memory (disk, RAM, etc.) and processed concurrently.

In contemporary user interactive multitasking systems, software resources that control common but rather specialized functions require large amounts of storage space. For instance, the IBM Operating System/2 (OS/2)[1] multitasking system contains Presentation Manager (PM) and Spooler subsystems which respectively control display and print job queue management functions of the system. These subsystems occupy over 1 Mb (Megabyte) of system storage space (both on system disks permanently, and in RAM while active). In networks of such systems, it may be necessary to store multiple copies of these subsystems at network stations (on station disks and at times in station RAM's).

[1]IBM and operating System/2 (OS/2) are trademarks of the International Business Machines Corporation.

A problem addressed presently is how to efficiently adapt contemporary operating systems, for managing specific tasks on a queued basis other than those normally handled on that basis. The solution presented here is to provide a specialized control utility for each type of "other than normal" task to be managed, which utility per se is incapable of controlling display and queue management functions relative to respective tasks, and to provide interfaces between each such utility and pre-existing presentation and queue management subsystems whereby the latter subsystems are controllable to provide needed display and queue management functions relative to respective tasks. Advantages of this approach are twofold; 1) it reduces time and cost of developing subsystems for managing execution of special tasks in a queued mode, and 2) it decreases the amount of storage space required by the system to manage both tasks which the system has traditionally accommodated and other tasks.

The example that is specifically described here is an adaptation of the OS/2 TM operating system, to construct a subsystem for managing queued processing of image data; for example, data produced by contemporary document scanning and facsimile reception devices. The OS/2 system per se does not include a task management subsystem of this type. However, by providing a relatively simple control utility for handling image data, which utility per se lacks capability for controlling display and queue controlling functions needed to direct queued processing of associated data, and adapting the utility to interface with the Presentation Manager and Spooler subsystems of that system, an efficiently constituted subsystem for image task management is realized.

The Spooler, which ordinarily only manages queueing of jobs for output devices, such as printers and plotters, is used here to queue document page, image data for associated special processing applications (e.g. conversion of data to forms suitable for display presentation, distribution to databases, printing, etc.). Furthermore, the present task control utility is so constructed that it can directly access queued image data transparent to (i. e. without assistance from) the Spooler. Thus, the utility provides more efficient handling of accessed image data, than it would if it had to invoke the Spooler during such handling, and the system is operated more efficiently inasmuch as the Spooler is free for other uses while the utility is accessing queued image data.

OBJECTS OF THE INVENTION

An object of the present invention is to provide a basis for developing efficiently constituted task management subsystems, for coordinating queued handling of special tasks in existing multitasking systems which normally do not accommodate handling of such tasks in a queued mode.

Another object is to provide a basis for developing efficiently constituted task management subsystems, for coordinating queued processing of special tasks in existing multitasking systems which normally do not accommodate such processing of these special tasks.

A related object is to provide efficient subsystems for coordinating queued processing of specific types of tasks, in multitasking systems in which tasks of the type presently contemplated are not ordinarily handled in a queued mode, wherein respective coordinating subsystems are so constructed that they occupy relatively small amounts of storage space in respective systems.

A related object is to provide task-specific task management subsystems, for coordinating queued handling in existing multitasking systems of jobs which ordinarily are not handled on a queued basis in such systems. A further related object is to construct such task-specific subsystems efficiently by basing each on a relatively simple task control utility, which utility per se lacks capabilities for directly controlling display and queue management functions relative to associated tasks, but contains interfaces to existing subsystems through which indirect control of these functions is realized.

A more particular object is to provide a subsystem, and associated method, for managing tasks of a special nature on a queued basis, in existing multitasking systems in which tasks of that nature are ordinarily not handled in a queued mode.

Relative to a particular embodiment of the invention described herein, an object is to provide for queued management of image processing tasks in existing versions of the OS/2 TM operating system. A related object is to provide for management of such tasks via a simplified utility, which utility per se lacks capability for directly controlling display and queue management functions relative to these tasks but has interfaces to existing presentation management and print spooler subsystems of the operating system by means of which these functions are indirectly controllable. A related object is to provide the foregoing utility with capability for directly controlling access to queued job data relating to associated tasks in a mode transparent to the print spooler.

The job data handled by the foregoing utility consists of representations of document image pages, that are produced originally at system computer workstations by e.g. document scanning equipment, image capture devices, facsimile receivers, etc. An object of the invention is to so organize the job files containing such data in the spooler queues that direct access by the associated utility is facilitated.

SUMMARY OF THE INVENTION

In an exemplary system to be described, a task management subsystem, for managing queued processing of document image data (e.g. data produced by document scanning equipment, image capture devices, facsimile communication, etc. ) contains unique interfaces to Presentation Manager (PM) and Print Spooler subsystems of existing versions of the OS/2 Operating System. The image task subsystem per se lacks capabilities for directly controlling display and queue management functions relative to associated image processing jobs, but controls these functions indirectly through its special interfaces to the OS/2 PM and Spooler subsystems.

Thus, the Spooler subsystem, which normally only manages queues associated with printing or plotting jobs, and display of job queue status relative to such jobs, is adapted by the presently defined task control utility to also manage queues of data associated with other types of jobs, such as jobs relating to scanned image data, and display of job status relative to printing/plotting and other jobs in its queues.

Extensions of this type of arrangement to management of a wide variety of non-printing/plotting jobs, in addition to the image handling jobs presently described, will be readily apparent to those skilled in the art. Thus, in a general context, we provide a subsystem for managing queued handling of various special types of tasks in a multitasking system in which such tasks are normally not handled in a queued mode. This subsystem is constructed efficiently by providing interfaces to existing queue management subsystems that are adapted normally to manage queueing of jobs of one specific type—e.g. printing jobs—and display presentation of respective queue status, whereby job queues for associated special tasks and display of associated queue status are indirectly managed through such interfaces.

A unique aspect of the present invention is that the subject task management facility can access associated queues containing associated jobs directly (i.e. without assistance from the subsystems which indirectly control management of respective job queues and display of associated status), whereby data of associated queued jobs can be efficiently retrieved for processing.

Such direct access is facilitated, relative to document page image data, by storing special page index and page count information with each associated job file. These functions effectively point to queue storage locations of individual document pages that form constituent elements of a respective job.

When applied in a network environment, the invention provides capability for coordinating queued handling of associated jobs at all network stations, and of displaying status of respective job queues at various stations. Status of queues residing at a server station is viewable at all stations. Status of queues residing at other stations is viewable only at respective other stations.

These and other features, aspects, advantages and benefits of the invention will be more fully understood and appreciated by considering the following description and claims.

BRIEF DESCRIPTION OF THE DRAWINGS

FIG. 2 illustrates organization of the printer spooling subsystem of a contemporary operating system in either a stand-alone computer workstation or a network station in the environment of FIG. 1.

FIG. 2A illustrates the organization of jobs in Spool Queues maintained by the subsystem of FIG. 2.

FIG. 3A illustrates a typical organization of printing and non-printing jobs in the Spool Queues when the present invention is operating.

FIG. 4 illustrates initial assignment of queue space to the Spooler subsystem.

FIG. 5 illustrates, in a general context, how scan image data is "spooled" (enqueued) in accordance with the present invention.

FIG. 6 illustrates, in a general context, how scan image data is retrieved in accordance with the present invention.

FIG. 7 is a flow diagram illustrating details of spooling operations characterized in general terms in FIG. 5.

FIGS. 7A and 7B illustrate details of operations and structures associated with FIG. 7.

FIG. 8 is a flow diagram illustrating details of image data retrieval operations characterized in general terms in FIG. 6.

FIGS. 8A thru 8C illustrate details of operations indicated in broad context in FIG. 8.

DETAILED DESCRIPTION OF THE INVENTION

Figure 1:
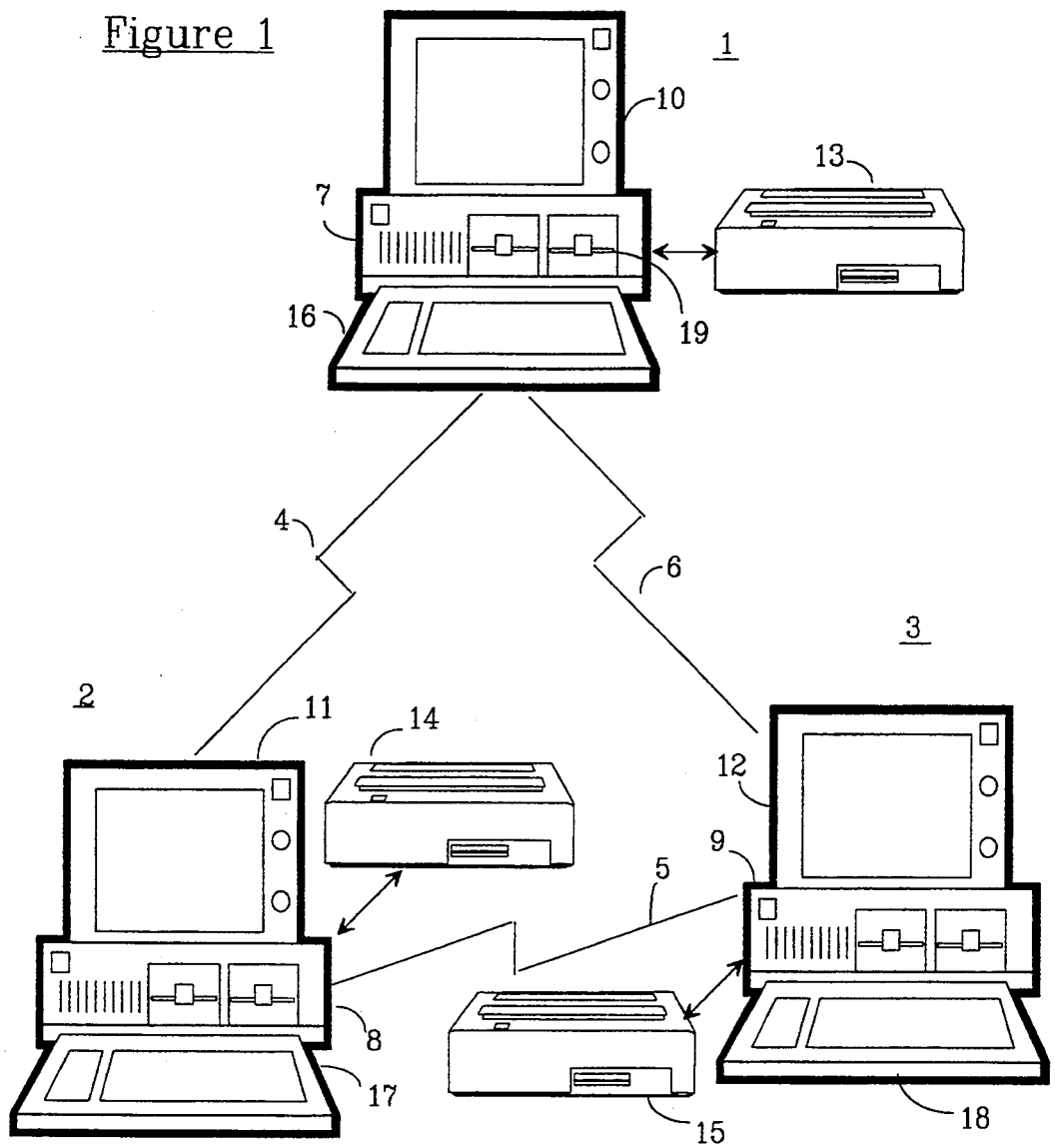
FIG. 1 illustrates a network environment in which the subject invention can be used to particular advantage.

FIGS. 1 and 2 respectively illustrate a network of intercommunicating computer stations 1-3, that represents a contemporary multitasking environment in which the present invention can be used to particular advantage. The invention can also be used to advantage in a computer workstation that is not coupled to a network. Although only three stations are shown in FIG. 1, it is understood that a typical network could contain many more stations.

In FIG. 1, communication links between stations are represented by jagged lines 4-6. The stations contain individual computer systems 7-9, individual display monitors 10-12 viewable by system users at respective stations, individual printers 13-15, individual keyboards 16-18 (or equivalent user input devices), and individual storage subsystems, one of which is indicated at 19. Each storage subsystem may include disk drives (hard and/or floppy) and random access memories (RAM's). Although the stations are illustrated as identical, it will be understood that in a more typical or realistic network environment they would probably have different configurations of equipment, and one station would be configured as a server relative to the other stations.

The computing system at each station generally includes a CPU (central processing unit), which executes programs of instructions. Such programs generally reside on disks while inactive (e.g. at a server station or at a respective local station) and in RAM units while active. Data that is processed by such programs is also stored in RAM and on disks. The CPU, disk drives and RAM units at station may be housed either in a single enclosure or separately.

In the environment presently contemplated, the stations operate under control of an operating system having multitasking capabilities; typically, an IBM ™ OS/2 ™ operating system. These systems contain Print Manager (PM) and Spooler subsystems, for respectively managing functions associated with display presentation and print job queueing. In a network environment, these subsystems may be stored in permanent form on disk drives at one or more stations. When active at any station, the subsystems are stored in respective station RAMs.

FIG. 2 illustrates a typical prior art station (network or standalone) in which the present invention can be used to advantage. The station is assumed to be supervised by an existing version of the OS/2 operating system. In that environment, program applications 20, operate through function calls to the abovementioned Spooler and PM subsystems of the operating system to control queues of print jobs relative to printer device 21, and presentation of associated job queue status to station users via display monitor (user interface) 22. Associated parts of the spooler and PM subsystems are respectively indicated at 23 and 24.

The Spooler comprises Print Manager and Queue Processor elements 25 and 26. The print manager directs entry of jobs into queues and purging of jobs from queues. The queue processor directs transfers of print jobs between the queues and printer 21. Outputs of applications such as 20, representing printing jobs to be enqueued, are transferred to the Print Manager via Device Context and Presentation Manager Driver modules, 28 and 29 respectively, and stored in pre-established spool queues 27. The spool queues are located in subdirectories of a pre-designated directory on one disk drive. Queued print jobs are retrieved by queue processor 26 and transferred to printer 21, as "output jobs", via PM driver module 30, and printer (kernel) device driver module 31.

The operating system and its associated presentation and printing control subsystems are fully described in one or more of the following documents published by the International Business Machines Corporation:

1. IBM Operating System/2 ™ Programming Tools and Information Version 1.2 Programming Guide (document number 64F0273); contains relevant background information on the OS/2 spooler subsystem organization (Chapter 36), including an illustration, FIG. 36-4, similar to FIG. 2 herein.
2. IBM Operating System/2 ™ Programming Tools and Information Version 1.2 Presentation Manager Programming Reference Volume 1 (document number 64F0276) contains relevant information on device context access (Chapter 3) , spooler function calls (Chapter 7) and system profile function calls (chapter 6).
3. IBM Operating System/2 ™ Programming Tools and Information Version 1.2 Control Program Programming Reference (document number 64F0275) contains relevant information on control program Function Calls (Chapter 2).
4. IBM Operating System/2 ™ Programming Tools and Information Version 1.2 I/O Subsystem and Device Support Volume 2 Presentation Driver Interfaces (document number 64F0283) contains relevant background information on Spooler subsystem organization and Function Calls (Chapter 17).
5. IBM Operating System/2 ™ Programming Tools and Information Version 1.2/1.3 Presentation Manager Programming Reference Volume 1 and Volume 2 Technical Upgrade (document number 85F1529), page 90, describes a function call for deleting jobs from a spooler queue.

Hereafter, references to the foregoing PTI (Programming Tools And Information) publications will identify their document numbers (e.g. PTI number 64F0246), and specific chapter and page(s).

The operating system comprises programs of instructions which are executable by CPU's at the stations. These programs are activated and deactivated (opened and closed) by predetermined function calls described in the above publications. Generally, such programs are stored on a disk drive and fetched to not-shown RAM (random access memory) memory units for execution.

The Spooler is designed specifically to manage queues of printing jobs relative to printing devices. Queues are established in sub-directories of a predetermined disk directory defined when the system is initially set up. The spooler manages creation of such sub-directories, assignment of specific queue names thereto, entry and removal of jobs (data files) relative to such queues, assignment of file names and job numbers to queue entries, and posting of information in system profile tables to indicate sub-directory/queue locations of currently enqueued files. The PM facility directs system displays, including displays of Spooler queue status. A user of the system can interact with the system through the display to vary the order in which jobs are sent to the printer, and even direct purging/cancellation of pending jobs from queues when appropriate (ordinarily, jobs are purged from the queue automatically, after they have been processed by the printer).

Typical form and job data content of two such queues are suggested in FIG. 2A. These queues and their job entries are given names associated with printers (e.g. PRN.1 as a queue name and JOBP11 as a job entry in that queue).

The Spooler per se (not counting the space required for its Fob queues) occupies approximately 1.1 Mb (megabytes) of system RAM while it is in active use at any station; so that it is understood that providing an equivalent and entirely separate queue management function for non-printing tasks not presently supported by the operating system could be very costly in terms of development costs and add considerable storage and memory costs to station configurations.

Now assume that in the network environment of FIG. 1 it is desired to equip one or more stations, of the type shown in FIG. 2, with equipment for producing document page image data that requires extensive processing that is performed most efficiently on a queued basis. Such data is generated, for instance, by document page scanning equipment such as 40 (FIG. 3), and/or facsimile receiving equipment such as 41 (FIG. 3) , and/or not-shown data capture equipment of various types (which is usually so expensive that it would be located only at a network server station). This data consists of bit maps having a non-standard form unsuited for station display and other applications (e.g. printing on standard printer devices). In a multi-media environment, the data could be accompanied by audio data complicating its format.

Image data for multiple document pages, might be generated rapidly in an unattended batch mode (e.g. by an expensive image capture or scanning device at a server station), have a non-standard form when so generated, be stored in that form on a disk drive in the respective station, and require special processing to convert it to a standard form suitable for other station uses. Such special processing is performed most effectively in a batch (i.e. queued) mode that allows for unattended transfer of the captured data to various queues, and distributed processing of the queued data in any or all of the network stations.

Considering this, it should be appreciated that it is useful to have management capabilities functionally equivalent to the Spooler, for coordinating queued handling of such document page image data and display interaction with users of the system relative to status of associated job queues. It is also appreciated that such capabilities, if provided exclusively for image data handling, would be rather costly to develop and impose undesired added storage requirements on system station owners.

Figure 3:
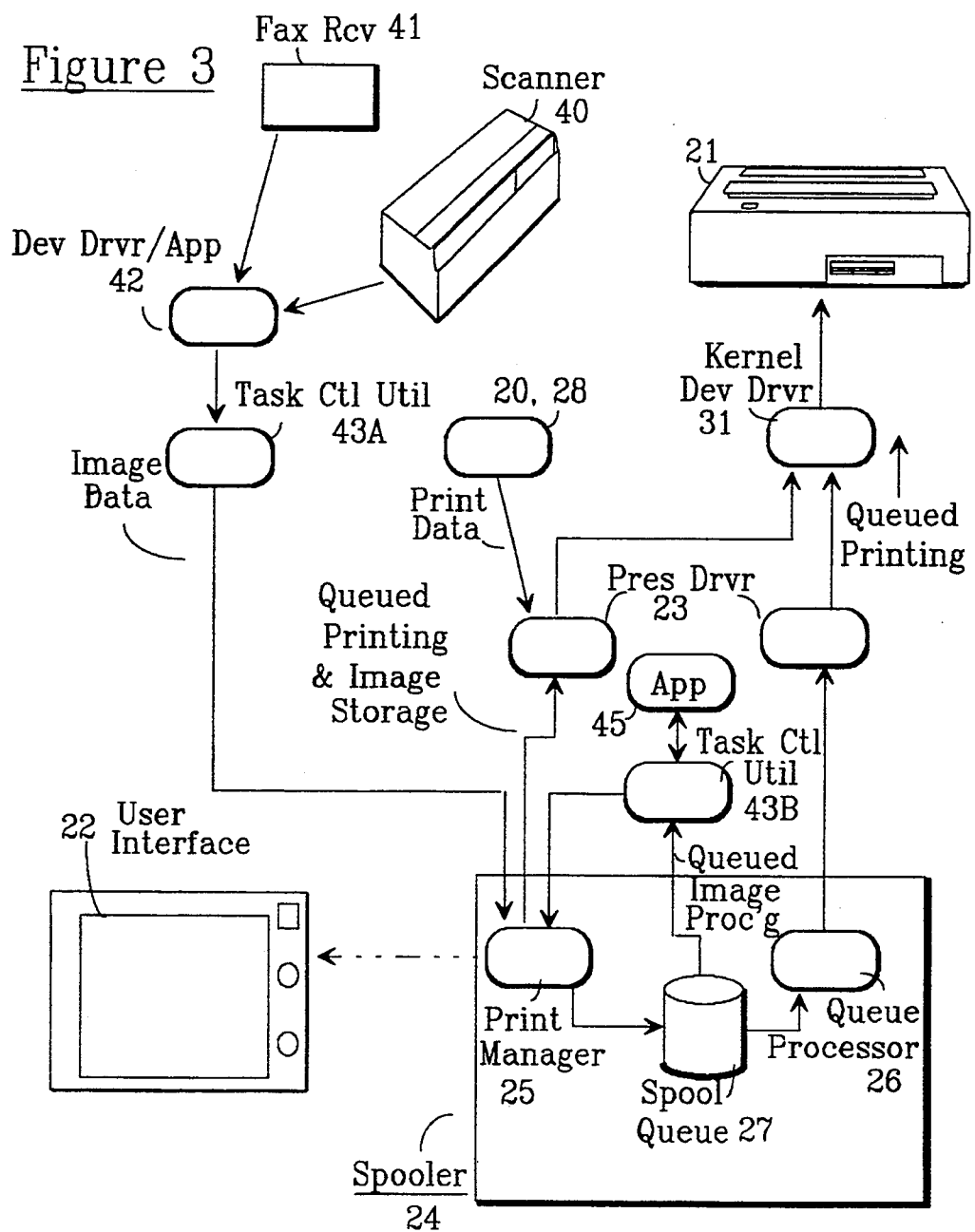
FIG. 3 illustrates an embodiment of the present invention formed by augmenting the subsystem of FIG. 2.

Accordingly, we have devised the arrangement shown in FIG. 3 for handling these functions on a more efficient basis. In this Figure, elements corresponding to those shown in FIG. 2 retain numbers used in the latter figure. Applications such as 42 interface between sources 40, 41 of (non-standard form) image data and a presently defined task control utility 43 which per se lacks functional capabilities for managing job queues and controlling display presentation relative to system users.

Utility 43 consists of parts 43A and 43B as shown in this Figure. Part 43A interfaces between applications 42 receiving newly generated image date and print manager 25, and serves to direct newly generated image job data into spooler queues 27. Part 43B has direct access to data in the image job queues and serves to transfer such data between respective queues and associated processing applications such as 45 (e.g. for converting image data between non-standard and standard forms).

Utility part 43A interacts with the print manager to spool/write image data jobs into associated job queues pre-established to store respective jobs. Such queues are set up in subdirectories of a predefined directory on a predefined disk drive, and are assigned names having a unique association to the type of job data that they are expected to store. As such queues are created the print manager enters their assigned names into a system profile listing (OSSYS.INI) that is useful subsequently by utility part 43B when it needs to retrieve job data from associated queues.

The resulting configuration of Spool Queues is suggested in FIG. 3A. Queues established to store image data jobs are given associated names (e.g. SCANQ.1) and respective jobs are given associated names (e.g. JOBS11, standing for "scan job" 1 in scan queue 1). Multiple queues can be established for a given source device; e.g. to provide for logical separation of jobs having different processing requirements.

After image data has been stored in a queue, utility part 43B operates "transparent to" (i.e. without direct assistance from) the Spooler to retrieve data from image queues for transferring such data, as "input jobs", to processing applications such as 45 (which function e.g. to convert the data to a form suitable for use by the application). After data in a given queue job file has been processed the respective file may be purged from the queue by interaction of utility parts 43B and 43A, and appropriate calls from 43A or 43B to the print manager.

In composing of operating system function calls for retrieving image data, utility part 43B uses queue location information in system profile tables, and job number information input by users of the image processing subsystem (which is obtainable by viewing print manager queue status displays presented at display interface 22) to form disk addresses of job files that are to be retrieved (queue subdirectory, file name, and page offset).

While we refer above, and in the following description, to a subsystem for managing processing of image data, where the subsystem comprises a nucleus formed around a task control utility having interfaces to specialized presentation and queue management services of the operating system, it should be understood that virtually identical techniques would be applicable for creating subsystems to manage other processes. Furthermore, where we refer in the following description to interfaces between the task control utility for image processing and a print spooler for obtaining "surrogate" queue management services through the spooler, it should be understood that equivalent "surrogate" queue management capability could be achieved by interfacing the same utility with any other specialized queue management facility.

In what follows, we describe details of image job file spooling and retrieval operations conducted under the direction of the subject task control utility, in association with OS/2 PM and Spooler facilities, and relevant function call parameters (consistent with OS/2 architecture) used therefor. After job files have been retrieved and processed, they are purged from the queues by means of print manager operations instigated by the subject utility (in order to free spooler subsystem resources used by the queued file).

FIG. 4 shows how spooler queues are established, using examples referring to image data queues but clearly applicable in the same context to print job queues. Ignoring the names assigned to image data queues, operations 50-53 shown here are fully described in the Programming Tools And Information references listed above.

As shown in FIG. 4, at system installation (initial setup), space in a specific directory of a specific drive is assigned to the Spooler for its queues (e.g. space in C: SPOOL, meaning subdirectory SPOOL on drive C). Within this space, specific queues are established for print jobs (see also FIG. 2A), and presently for image data (operations 51, 52; see also FIG. 3A) representing input jobs to applications such as 45 (FIG. 3). OS/2 System profile table OS2SYS.INI is updated by the Spooler to reflect these assignments (operation 53; refer to Document 64F0283, Appendix B).

FIG. 5 illustrates, in very general terms, how input job data is written by the Spooler into associated queues; in particular, image page data for input to associated processing applications. Details of associated operations and storage structures are discussed later with reference to FIGS. 7, 7A and 7B. As page data is generated (operation 60), it is passed to the Spooler (operation 61) and written by the latter into a respective queue (operation 62).

The data is handled initially by an application (42, FIG. 3), and then successively by an API (application programming interface) element in the subject utility (43A, FIG. 3) and the Spooler Print Manager. The data is presented to the print manager with information provided by the utility which identifies a destination Spool queue. Using that information, and information in system profile OS2SYS.INI, the Print Manager assigns a unique file name and job number to tile data and transfers the data to the operating system with a DosWrite function call (PTI 64F0275, chapter 2, page 2-391 to 2-396) that causes the operating system to write the data into the appropriate disk queue.

A job may include multiple pages of data. These pages are entered into the queue through repetitive sequences of operations initiated by the utility. As each page is entered, the utility updates certain page offset and page count parameters associated with the file. These parameters indicate offsets of individual pages, relative to a reference starting point in the file, and the number of pages in the file. After the last page of a job has been written into the queue, actions are initiated by the utility to write the updated parameters into the file.

Thereafter, the print manager and utility return information to the initiating application indicating the job number assigned to the respective job. The job number is also viewable by system users in job status displays provided by the print manager. The job number is needed for subsequent retrieval of the queued job data.

FIG. 6 describes, in very general terms, how page data is retrieved from Spool queues for further processing (e.g. by applications such as 45, FIG. 3). Details of associated operations and control parameters are described later with reference to FIGS. 8 and 8A through 8C. In response to presently defined function call RetrieveInputJob, the subject task control utility (43, FIG. 3) acts, in a manner transparent to the Spooler, to retrieve an image data file from an associated Spool Queue (operation 65, FIG. 6). The foregoing function call is presented to the utility either by user initiative or in association with semaphore signals posted by an application or operating system element in a manner which is presently well known in the art.

Assuming user initiative, the user enters the job and page number of data to be retrieved (66, FIG. 6), which the utility incorporates into a RetrieveInputJob call. Using the call information, and information derived from the system profile, the utility interacts with the operating system, via DosOpen and DosRead function calls, to cause the latter system to retrieve the designated file page (operation 67, FIG. 6) and transfer the same to the utility. The utility then transfers the retrieved data to an application 45 (operation 68, FIG. 6) that performs a required process (e.g. conversion of image data from non-standard to standard form).

As shown at 69, after job data has been retrieved and passed to a processing application, it may be purged from the queue. Optionally, this action may be instigated by the subject utility automatically after the retrieval process is concluded.

Details of Image Data Spooling

FIG. 7 illustrates how the subject utility directs entry of document page data into predefined spooler queues (queues pre-established by interaction of system users with the spooler and presentation manager subsystems). FIG. 7A shows how such page data queues are organized, and FIG. 7B illustrates details of operations associated with that organization.

In FIG. 7 and 7B, OS/2 function calls associated with individual operations are indicated in brackets. These function calls are described in the OS/2 Programming Tools And Information (PTI) publications listed earlier by document numbers (i.e. 64F0273, 64F0275, 64F0276, and 64F0283), and associated publication references for these descriptions are identified below by designation of respective document numbers.

As shown in FIG. 7, data representing a single image data "spooling job"—typically, data representing a number of successively formed document page representations, and certain associated page location parameters—is transferred to a selected spool queue as the data is generated. Operations required for this are directed by the subject task control utility in response to an InputSpoolJob task call presented to the utility by the application or driver receiving the generated image data. In response to such task calls, the utility: invokes/opens the spooler print manager and initiates it for a spooling job, directs writing by the print manager of data sets representing one or more pages of a document into a designated job file space in a designated queue, constructs a page index array and page count defining the size of the job file, directs the spooler to append as a final entry to the job file, after the last document page has been written therein, final values of the page index array and page count, and concludes by ending the spooling job and closing the print manager.

The print manager is opened for a queue entry task by a SplQmOpen() OS/2 function call (reference: PTI 64F0276 chapter 7, page 7-5). The information accompanying the function call (in the parentheses shown above) defines the number of data items to be supplied for the associated operation.

The queue entry task is started by a SplQmStartDoc() OS/2 function call (reference: PTI 64F0276, chapter 7, page 7-6). Although this particular call normally is used to indicate the start of a printing job, its use presently for enqueueing non-printing data is indistinguishable from its normal use from the perspective of the spooler print manager.

Each item of data to be enqueued (in present terms, the page image data sets of one document, and associated Offset Index and Page Count functions) is transferred to the spooler print manager with plural SplQmWrite() OS/2 function calls (reference: PTI 64F0276, chapt. 7, page 7-7). In the present arrangement, a multiple of 3 such calls is needed. The multiple required depends on the item byte length, inasmuch as a single multiple of 3 SplQmWrite calls, as presently used, can accommodate writing of no more than 65,535 bytes.

Ending the enqueueing task is accomplished by presenting the print manager with a SplQmEndDoc() function call (reference: PTI 64F0276, chapt. 7, page 7-4), and closing of the print manager is effected by function call SplQmClose() (reference: PTI 64F0276, chapter 7, page 7-3).

The resulting image data job file structure formed in the queue is shown in FIG. 7A, and details of task utility operations relative to formation of that structure are shown in FIG. 7B.

The job file contains data sets representing one or more document pages (pages 1-N), followed by a page offset array (the page index referred to above), and a page count ("total #..") indicating the number of data pages in that file. The offset values in the index define offsets of respective data pages from a reference position in storage at which the space allocated to that file begins.

Referring to FIG. 7B, in performing a spooling job, the subject utility repeatedly fetches data sets representing document page bit maps (in response to GetPage task calls) and transfers them to the spooler print manager along with associated write (SplQmwrite) function calls causing the print manager to write the respective data to a designated job file in a designated spool queue. As each page is written, the utility updates a page count and calculates a page offset associated with the respective page.

The offset for a page currently being written is developed by adding the offset and (byte) length of the previously written page; whereby each newly calculated offset effectively points to the beginning of the associated page. The initial offset value is a constant (presently, a value of "2", allowing for a separation of 2 byte spaces between the storage reference position for a given job file and the position at which the beginning of the first page is written).

The page offset values, calculated as successive pages are written, forms the page offset/index array. After the last page of the job file is written to the spool queue, the associated page index array and final page count are respectively written, effectively being appended to the end of the last page in the job file. It should be understood that this merely represents a convenient technique for storing the file control information, and that storage of the page index and page count elsewhere in the file would also be considered consistent with the present invention.

Details of Image Data Retrieval

FIG. 8 illustrates the operating sequence for retrieval of page image job data. As noted earlier, retrieval is carried out transparent to the Spooler subsystem, and may be used to recover individual pages of a multi-page job.

At the beginning of a data retrieval sequence, operations 90 are performed to select a job for retrieval (details indicated in FIG. 8A discussed later). Then operations 91 are performed (details in FIG. 8B discussed later) to retrieve file control information (offset array and page count) associated with a job file selected by operations 90. Then, a data page in the selected job file is retrieved by operations 92 (details in FIG. 8C discussed later), and returned for use by the application responsible for processing that data (operation 93, FIG. 8).

At 94, a determination is made of whether to proceed with retrieval of more data pages or to conclude the retrieval process relative to the job file currently being accessed. If more pages are to be retrieved, operations 92-94 are repeated. If no more pages are to be accessed, the operation concludes. Optionally, as indicated at 95, when the operation concludes, the job file just processed may be purged (deleted) from the queue by issuance of a Delete Print Job [DosPrintJobDel] function call from the subject utility to the print manager (PTI 85F1529, page 90).

Referring to FIG. 8A, the sequence 90, for selecting a job to retrieve, consists of operations 90.1, 90.2 and 90.3. In operation 90.1, the utility acts through a "QueryDevice" API (action 90, FIG. 8) to retrieve a list of all devices which may be used in a queued manner. For each such device, indications are returned indicating if the device is used for input or output and one or more identity (ID) values indicating a job queue or queues associated with the device. Each associated queue has a separate ID value. Associated information returned with the ID indicates whether the device is at a server or local. From this list, the user selects/inputs a device ID for the forthcoming selection operation.

In operation 90.2, a Job ID is selected. Usually, this is done by a user. The Job ID effectively identifies a job in a queue associated with a device queue identified in the previous operation. Generally, the user selects the next Job ID by viewing a print manager screen that displays IDs of all jobs currently queued, and selecting one to be processed. Optionally, the user can select a job ID of zero, indicating that the next available job in the queue should be processed.

In the next operation, 90.3, FIG. 8) an API "GetSpoolJob", associated with the task utility, is invoked to input DeviceID, JobID and Peek information to the utility (which effectively designates a job file to be accessed), where:

DeviceID is a value selected from the information returned by the QueryDevice API, identifying a particular queue associated with a particular device (in the present example, a queue associated with a source of page image data).

JobID is a value selected by a system user to designate a selected job file (in the present situation, a job file of page image data).

Peek is a value indicating if the current access is for viewing only or for processing the designated job.

In operations 91, the utility acts to instigate retrieval of control information (page index, page count) for the selected job file. Referring to FIG. 8B, operations 91 comprise actions 91.1 through 91.4 associated with indicated function calls. In action 91.1, the designated job file is opened by a DosOpen call (PTI 64F0275, page 2-201). In action 91.2, a pair of function calls DosChgFilePtr (PTI 64F0275, PAGE 2-20), are used to move a file point forward to the end of the designated file and then backward to the beginning of the field containing the desired control information. In action 91.3 the control information is read by a DosRead call (PTI 64F0275, 2-281), and in action 91.4 the file is closed by a DosClose call (PTI 64F0275, 2-23).

In the next sequence, 92, a page in the chosen job file is selected for retrieval and retrieved. Referring to FIG. 8C, this sequence consists of actions 92.1 through 92.4. In 92.1 the page to be accessed is selected and associated information designating the selection is input to the utility. This action is taken via a GetSpoolPage API, that returns values of JobHandle and PageNumber functions, where:

JobHandle identifies the job containing the page to be accessed.

PageNumber dentures the number of the page to be accessed. If the value is 0, the page selected will be the page determined by the offset value previously retrieved. If no pages have yet been retrieved, this will select the page at the first offset position.

In the next action, 92.2 the selected job file is reopened by a DosOpen call. Then, in the next action 92.3 the selected page is read by a DosRead call. Finally, in action 92.4, the job file is closed by a DosClose call. The retrieved page data is returned (to the destination application) for viewing or processing (93, FIG. 8).

As noted earlier, if the page just read is not the last page to be viewed or processed, the foregoing sequence is repeated for retrieving additional pages from the same job file. If the page just retrieved is the last page to be handled, the utility sequence concludes. Optionally, at this stage, the utility can purge the associated job from the designated queue (95, FIG. 8, and call DosPrintJobDel noted earlier).

The foregoing sequence for page retrieval is handled in an "atomic" mode for each page selection (by opening and closing the respective file for each page), so that while the task control utility is retrieving any page the status of the respective job can not be changed by other program entities. This is necessary because in the presently contemplated environment, it is possible for different users and/or stations to hold the same job data concurrently (although only one accessing entity can be handling the data for processing), and it is considered potentially confusing and misleading to allow for the possibility of a job being cancelled by one entity while it is being accessed by another.

What is claimed is:

1. A user interactive multitasking data processing system, said system comprising:
   a queue controller normally used only for controlling queueing of jobs relative to a first particular type of tasks performed in said system;
   a task control subsystem for coordinating performance on a queued basis of processing tasks of a second particular type different from said first type, said subsystem comprising:
   means for conditioning said queue controller to establish storage queues for tasks of said second type;
   means for receiving second type data upon which said tasks of said second type are to be performed;
   means including said queue controller for transferring said second type data between said receiving means and said queue controller and for conditioning said controller to write said second type data into said established queues for tasks of the second type; and
   means for accessing said second type data stored in said storage queues associated with tasks of said second type in a manner that is independent of said queue controller, in order to control further processing of said data.

2. A user interactive multitasking data processing system, said comprising:
   an output device;
   a queue controller normally used only for controlling queueing of first type data jobs relative to said output device;
   a task control subsystem for coordinating performance of processing tasks unrelated to said output device jobs comprising:
   means for conditioning said queue controller to establish queues uniquely associated with said unrelated processing tasks;
   means for receiving second type data upon which said unrelated processing tasks are to be performed;
   means cooperative with said queue controller for transferring said received second type data to said queue controller along with information effectively identifying one of said established queues that is associated with said second type data;
   means in said queue controller responsive to said identifying information for storing said received second type data in said identified one queue; and
   means for retrieving said second type data from said identified one queue in a manner that is independent of said queue controller for enabling said unrelated tasks to be performed on said second type data.

3. A data processing system, comprising:
   first and second subsystems for respectively managing display presentation and print job queueing processes;
   a task manager for directing performance of first and second non-printing jobs on a queued basis comprising:
   means for conditioning said second subsystem to establish first and second queues uniquely associated with said first and second non-printing jobs;
   means for receiving non-printing data on which said first and second non-printing jobs are to be performed;
   means for transferring said non-printing data to said second subsystem along with information effectively identifying which one of said first and second queues that is associated with said non-printing data;
   means in said second subsystem responsive to said identifying information for writing said transferred non-printing data into said one of said first and second queues that is identified by said information; and
   means interactive with users of said system, via said first subsystem, for accessing said non-printing data of individual non-printing jobs stored in said first and second queues, in a manner that is independent of said first and second subsystems in order to direct performance of said non-printing jobs on said stored non-printing data; said interactive means being responsive at least in part to information supplied by said users for locating said stored non-printing data.

4. A data processing system, comprising:
   spooler and presentation management subsystems for respectively managing storage of data associated with printing jobs, in storage queues associated with said printing jobs, and display of information to system users relative to said printing jobs;
   an image processing task manager, for directing performance of processing tasks on image page data of the type produced by document scanning or image capture equipment, comprising:
   means for conditioning said spooler subsystem to establish image queues exclusively associated with said image page data;
   a source of image page data;
   means coupled between said image page data source and said spooler subsystem for directing said spooler subsystem to write image page data produced at said source into said exclusively associated image queues;
   means operating through said display presentation management subsystem for displaying information to said system users, said information associating said image page data with one of said image queues; and
   means responsive to information supplied by said system users, and for accessing image page data in said exclusively associated queues in a manner that is independent of said spooler and presentation management subsystems, whereby said image page data so accessed may be subjected to one of said processing tasks without intermediate handling by the spooler subsystem.

5. A task manager in accordance with claim 4 wherein said spooler subsystem is conditioned to establish said page image storage queues and enter page image data therein in response to function calls of predetermined form architecturally compatible with a preexistent operating system in which said spooler subsystem is designed to operate.

6. A task manager in accordance with claim 5 wherein said image data accessing means comprises:
   means for accessing a system (Profile) table containing information identifying queues established by said spooler subsystem; and
   means for using information extracted from said profile table, together with job number information supplied by said system users, for determining locations of specific page image data sets to be accessed.

7. A data processing system, comprising:
   a spooler subsystem for respectively managing storage of data associated with queued printing jobs and display of information to system users relative to said printing jobs;
   a subsystem for managing queued processing of document page image data comprising:
      first means cooperative with said spooler subsystem for establishing spooler controlled page job queues for storing said page image data separate from data representing said printing jobs; each of said page job queues being useful to store image data representing multiple pages of a document;
      second means cooperative with said spooler subsystem for writing image data representing multiple pages of a document into a selected one of said queues;
      means associated with said second means for constructing a page index array and page count control parameters, said page index array defining offsets of each of said multiple pages relative to a predetermined reference position in said queue, and said page count defining the number of pages entered into said queue;
      third means cooperative with said spooler subsystem for writing said index array and page count parameters into said selected one of said queues in a predetermined position relative to the data representing said pages; and
      means for accessing data in said selected one of said queues representing selected ones of said multiple pages in a manner that is independent of said spooler subsystem, for directing further processing of said accessed data; said accessing means including means for retrieving said page index array and page count, and means for using said page index array and page count for locating and retrieving said selected ones of said multiple pages.

8. In a user interactive multitasking data processing system, having a first particular type of tasks performed in said system, a method of coordinating performance on a queued basis of processing tasks of a second particular type different from said first type, said method comprising the steps of:
   providing a queue controller normally used only for controlling queueing of first type data jobs relative to said first particular type of tasks;
   conditioning said queue controller to establish job queues for tasks of said second type;
   receiving second type data upon which tasks of said second type are to be performed;
   transferring said received second type data to said queue controller, while conditioning said controller to write said second type data into designated job queues for tasks of the second type; and
   subsequently retrieving said second type data from said job queues in a manner that is independent of said queue controller, for enabling said second type data to be subjected to said tasks of said second type.

9. In a user interactive multitasking data processing system, which system includes an output device and jobs related to said output device, a method for coordinating performance of processing tasks unrelated to said output device jobs comprising the steps of:
   providing a queue controller normally used only for controlling queueing of said jobs relative to said output device;
   conditioning said queue controller to establish job queues uniquely associated with said unrelated processing tasks;
   receiving second data upon which said unrelated processing tasks are to be performed;
   transferring said received second data to said queue controller along with command information conditioning said queue controller to store said received second data in one of said associated job queues;
   retrieving said second data subsequently from said one associated job queue in a manner that is independent of said queue controller, in order to present said second data for performance of said unrelated tasks.

10. The method of claim 9, wherein said step of retrieving said second data includes:
    selecting a queue job file from which said second data is to be retrieved; said job file containing one or more pages of said second data to be individually retrieved and individually processed:
    retrieving control information from said job file indicating the number of pages contained in the file and offsets of each page from a common reference position at a boundary of the file;
    using said control information to select a page to be retrieved; and
    retrieving the selected page.

11. The method of claim 10 wherein said step of selecting a job file involves:
    input by a system user of a Job ID number selected by that user; said number denoting a specific job.

12. The method of claim 11 wherein the value of said Job ID input by said user is determined by said user by examining a display screen listing of job queue status.

13. The method of claim 10 wherein, following said step of retrieving said selected page, additional actions are taken including:
    determining if the selected job file contains more pages to be retrieved;
    if the file does contain more pages, retrieving another page by repeating the operations of claim 10; and
    if the file does not contain more pages, concluding the operation and deleting the selected job file from the selected queue.

14. A method for directing performance of non-printing jobs on a queued basis in a data processing system comprising the steps of:
    providing first and second subsystems for respectively managing display presentation and print job queueing processes;
    conditioning said second subsystem to establish job queues uniquely associated with non-printing jobs;

receiving data on which said non-printing jobs are to be performed;

transferring said data to said second subsystem along with command information conditioning said second subsystem to write said data into a designed non-printing job queue; and retrieving said data subsequently from said designated non-printing job queue in a manner that is independent of said second subsystem, in order to prepare said data for performance of a respective non-printing Job.

15. The method of claim 14 wherein said retrieving step includes:

receiving information from a user of said system partially identifying the data to be retrieved, where said user can obtain said information by interacting with said second subsystem;

based on the received information, accessing other information in a system profile table indicating storage locations of a queue and job file containing the identified data; and retrieving said data based on said other information.

* * * * *